United States Patent
Lim et al.

(10) Patent No.: US 9,219,852 B2
(45) Date of Patent: Dec. 22, 2015

(54) METHOD AND SYSTEM FOR CREATING, RECEIVING AND PLAYING MULTIVIEW IMAGES, AND RELATED MOBILE COMMUNICATION DEVICE

(71) Applicant: Samsung Electronics Co., Ltd., Suwon-si, Gyeonggi-do (KR)

(72) Inventors: Chae Whan Lim, Suseong-gu (KR); Sung Hwan Kang, Jung-gu (KR); Min Jun Kim, Dalseo-gu (KR); Sung Ho Kim, Suseong-gu (KR); Jung Won Lee, Jin-gu (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/853,314

(22) Filed: Mar. 29, 2013

(65) Prior Publication Data

US 2013/0216155 A1 Aug. 22, 2013

Related U.S. Application Data

(63) Continuation of application No. 12/317,577, filed on Dec. 24, 2008, now abandoned.

(30) Foreign Application Priority Data

Dec. 24, 2007 (KR) .................. 10-2007-0136472
Nov. 28, 2008 (KR) .................. 10-2008-0119323

(51) Int. Cl.

| | | |
|---|---|---|
| *H04N 5/232* | (2006.01) | |
| *H04N 19/134* | (2014.01) | |
| *H04N 19/597* | (2014.01) | |
| *H04N 19/61* | (2014.01) | |
| *H04N 19/12* | (2014.01) | |
| *H04N 19/164* | (2014.01) | |
| *G06T 3/40* | (2006.01) | |
| *H04N 21/81* | (2011.01) | |
| *H04N 21/658* | (2011.01) | |
| *H04N 21/2665* | (2011.01) | |
| *H04N 21/2343* | (2011.01) | |
| *H04N 7/16* | (2011.01) | |

(Continued)

(52) U.S. Cl.
CPC ............. *H04N 5/23206* (2013.01); *G06T 3/40* (2013.01); *H04N 5/23238* (2013.01); *H04N 5/23293* (2013.01); *H04N 5/247* (2013.01); *H04N 7/165* (2013.01); *H04N 19/12* (2014.11); *H04N 19/134* (2014.11); *H04N 19/164* (2014.11); *H04N 19/597* (2014.11); *H04N 19/61* (2014.11); *H04N 21/21805* (2013.01); *H04N 21/2343* (2013.01); *H04N 21/2665* (2013.01); *H04N 21/2743* (2013.01); *H04N 21/658* (2013.01); *H04N 21/8166* (2013.01)

(58) Field of Classification Search
USPC ........................................ 348/218.1; 725/105
See application file for complete search history.

(56) References Cited

U.S. PATENT DOCUMENTS 6,990,228 B1 * 1/2006 Wiles et al. .................... 382/154
7,031,700 B1    4/2006 Weaver et al.

(Continued)

*Primary Examiner* — Nelson D. Hernández Hernández

(57) ABSTRACT

A method and a system for creating, receiving and playing multi-view images are provided, and a related mobile communication device is also provided. A service server in the system receives images collected by the devices and encodes the received images based at least partly on redundancy of the images. The service server converts the received images into the multi-view images and sends them to a client terminal.

20 Claims, 11 Drawing Sheets

(51) Int. Cl.
*H04N 5/247* (2006.01)
*H04N 21/2743* (2011.01)
*H04N 21/218* (2011.01)

(56) References Cited

U.S. PATENT DOCUMENTS

| | | |
|---|---|---|
| 2002/0118958 A1 | 8/2002 | Ishikawa et al. |
| 2003/0112354 A1* | 6/2003 | Ortiz et al. ............... 348/333.01 |
| 2003/0197785 A1* | 10/2003 | White et al. ............. 348/207.99 |
| 2005/0012812 A1 | 1/2005 | Seo |
| 2005/0120381 A1 | 6/2005 | Yamaguchi |
| 2005/0151852 A1* | 7/2005 | Jomppanen ................ 348/218.1 |
| 2005/0264648 A1 | 12/2005 | Ivanshin et al. |
| 2005/0286444 A1 | 12/2005 | Yang et al. |
| 2006/0029129 A1* | 2/2006 | Hannuksela ............. 375/240.01 |
| 2006/0104347 A1 | 5/2006 | Callan et al. |
| 2006/0140138 A1 | 6/2006 | Hill |
| 2006/0244813 A1 | 11/2006 | Relan et al. |
| 2007/0081081 A1* | 4/2007 | Cheng ........................ 348/218.1 |
| 2007/0093238 A1 | 4/2007 | Lin |
| 2007/0285500 A1 | 12/2007 | Ma et al. |
| 2008/0068446 A1 | 3/2008 | Barkley et al. |
| 2008/0068447 A1 | 3/2008 | Mattila et al. |
| 2009/0011753 A1 | 1/2009 | Barnier |

* cited by examiner

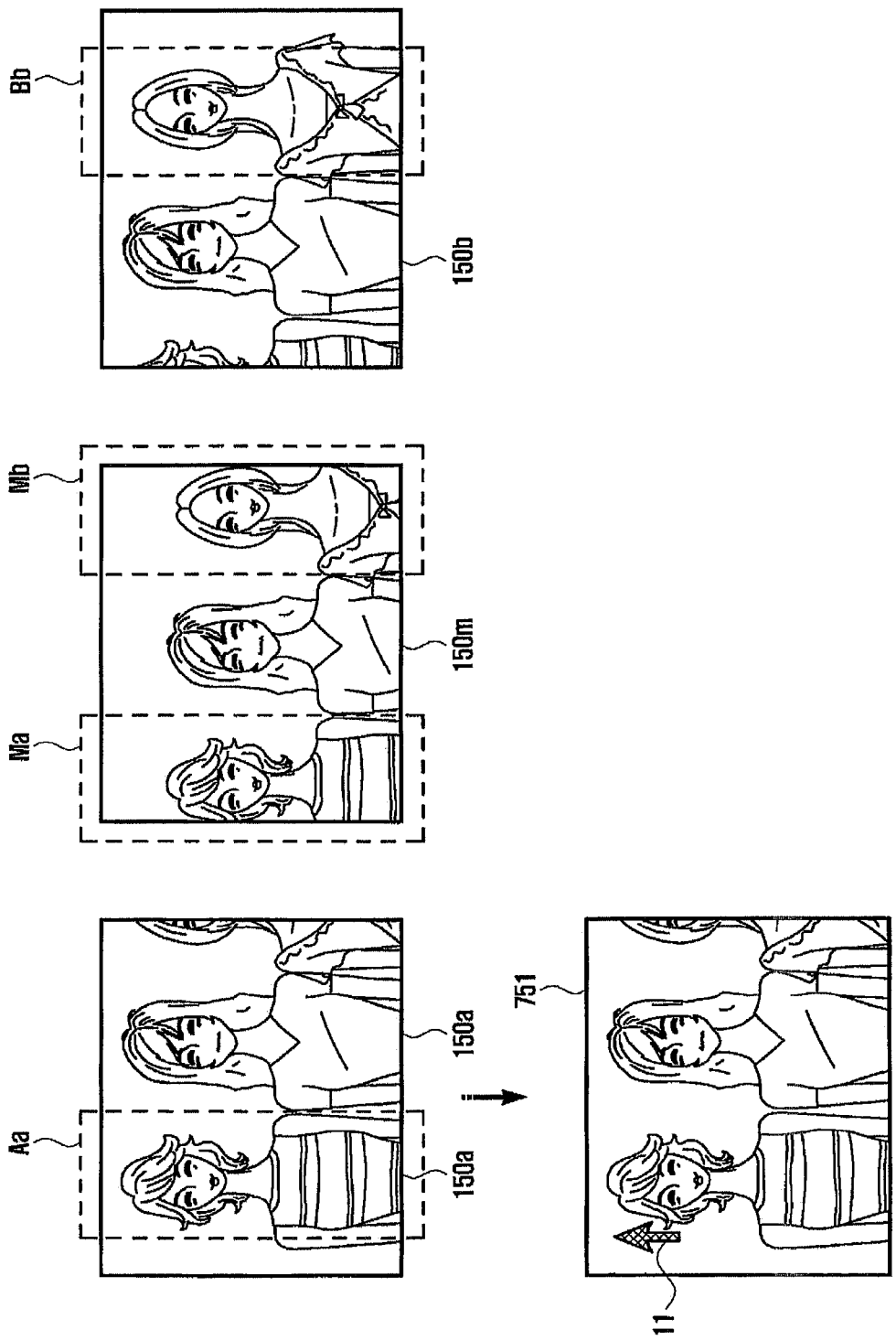

METHOD AND SYSTEM FOR CREATING, RECEIVING AND PLAYING MULTIVIEW IMAGES, AND RELATED MOBILE COMMUNICATION DEVICE

CROSS-REFERENCE TO RELATED APPLICATION(S) AND CLAIM OF PRIORITY

The present application is a continuation of U.S. patent application Ser. No. 12/317,577, filed on Dec. 24, 2008, which claims priority to applications entitled "METHOD AND SYSTEM FOR CREATING, RECEIVING AND PLAYING MULTIVIEW IMAGES, AND RELATED MOBILE COMMUNICATION DEVICE" filed in the Korean Intellectual Property Office on Dec. 24, 2007 and assigned Ser. No. 10-2007-0136472 and on Nov. 28, 2008 and assigned Ser. No. 10-2008-0119323. The contents of Applications 12/317,577, 10-2007-0136472, and 10-2008-0119323 are incorporated herein by reference.

TECHNICAL FIELD OF THE INVENTION

The present invention relates generally to techniques of a multi-view image service and, more particularly, to a method and a system for converting individual images acquired at several angles by cameras of plural mobile communication devices into multi-view images, and a related mobile communication device.

BACKGROUND OF THE INVENTION

A communication device enables persons in different locations to easily and immediately transmit information to each other. Recent advances in communication technology provide communication devices with portability, thus realizing mobile communication devices. These days such mobile communication devices are rapidly increasing in use over the world.

In addition to a traditional function of voice call, a mobile communication device today has a great variety of functions such as message transmission, music file play, camera, image file display, and so forth. That is, a mobile communication device today is integrated with new-proposed various services and thereby offers substantial convergence services.

SUMMARY OF THE INVENTION

To address the above-discussed deficiencies of the prior art, it is a primary object to provide technical advances that allow creating multi-view images by converting individual images acquired at several angles by cameras of plural mobile communication devices into the multi-view images.

According to an aspect of the present invention, a method for creating multi-view images is provided. This method comprises obtaining certification of a multi-view image service at a master device; grouping mobile communication devices for creation of the multi-view images by the master device; selecting an image processing server being available for the grouped mobile communication devices; acquiring images of a photographing target by the grouped mobile communication devices; transmitting the images to the selected image processing server; and converting the images into the multi-view images.

According to another aspect of the present invention, a method for receiving and playing multi-view images is provided. This method comprises selecting a content including the multi-view images; selecting a receiving type for receiving the content; receiving the content according to the selected receiving type; playing the received content; and if there is a request for playing the multi-view images while the content is played, playing the multi-view images of a scene corresponding to a time of the request.

According to still another aspect of the present invention, a system for a multi-view image service is provided. This system comprises a plurality of mobile communication devices obtaining certification of the multi-view image service, forming a group for creation of multi-view images, acquiring and transmitting images of a photographing target; and a service server performing the certification to at least one of the plurality of mobile communication, receiving the images transmitted from the mobile communication devices, and encoding the received images into the multi-view images based at least partly on redundancy of the received images.

According to still another aspect of the present invention, provided is a mobile communication device that comprises a camera acquiring images; a control unit controlling the acquisition of the images by the camera, and controlling the transmission of the images; and a short-distance wireless communication module establishing a short-distance wireless communication channel with other mobile communication devices under the control of the control unit. Here, the control unit acquires device information and camera information about the mobile communication devices through the short-distance wireless communication module and performs grouping of the mobile communication devices.

According to still another aspect of the present invention, provided is a mobile communication device that comprises a camera acquiring images; a control unit controlling the acquisition of the images by the camera, and controlling the transmission of the images; and a short-distance wireless communication module establishing a short-distance wireless communication channel with other mobile communication devices under the control of the control unit. Here, the control unit, when receiving a standard block from a specific one of the other mobile communication devices, the standard block corresponding to at least one part of an image acquired by the specific mobile communication device, detects a compared block corresponding to the standard block by comparing the standard block with the acquired image, determines a degree of image discordance between the standard block with the compared block, and displays an indicator for the movement of a camera focus so as to adjust the image discordance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is an example view showing a photographing method using mobile communication devices in accordance with an exemplary embodiment of the present invention.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication device.

Mobile communication devices to be described below may be classified into a master device controlling a service for creating multi-view images, and other devices each acquiring moving images under the control of the master device. Mobile communication devices may have application programs for multi-view image creation, and the first device to enable such application programs may be appointed as the master device. Also, the master authority may be transferred to another device. That is, any mobile communication device can become the master device, which is not fixed to a specific device. Hereinafter, each mobile communication device may become a master device controlling multi-view image creation, a participant in multi-view image creation, or any other device for receiving and playing multi-view images.

An image processing server creates multi-view images from individual images sent by other devices. Here, the image processing server creates moving images regarding a base image among the whole images, and links multi-view images to each moving image. So, by selecting a link of a specific scene while watching moving images, a user can see multi-view images regarding the selected specific scene.

Embodiments described herein of the present invention relate to acquisition and transmission of images between a service server and a mobile communication device, creation of multi-view images through conversion, and reception and play of such multi-view images. Therefore, a method and a system according to embodiments of the present invention will be often referred to as a multi-view image service method and a multi-view image service system.

A mobile communication device employed for the present invention may not be limited to any specific kind of portable device. A mobile communication device in the present invention can acquire images through a camera and transmit them to a specific server or any other mobile communication device. A mobile communication device in the present invention may be a personal digital assistant (PDA), a smart phone, or a 3G terminal such as an international mobile telecommunication 2000 (IMT-2000) terminal, a wideband code division multiple access (WCDMA) terminal, and a universal mobile telecommunication service (UMTS) terminal. Alternatively, the present invention may employ any other kinds of communication devices, multimedia devices, and their suitable equivalents.

Figure 1:
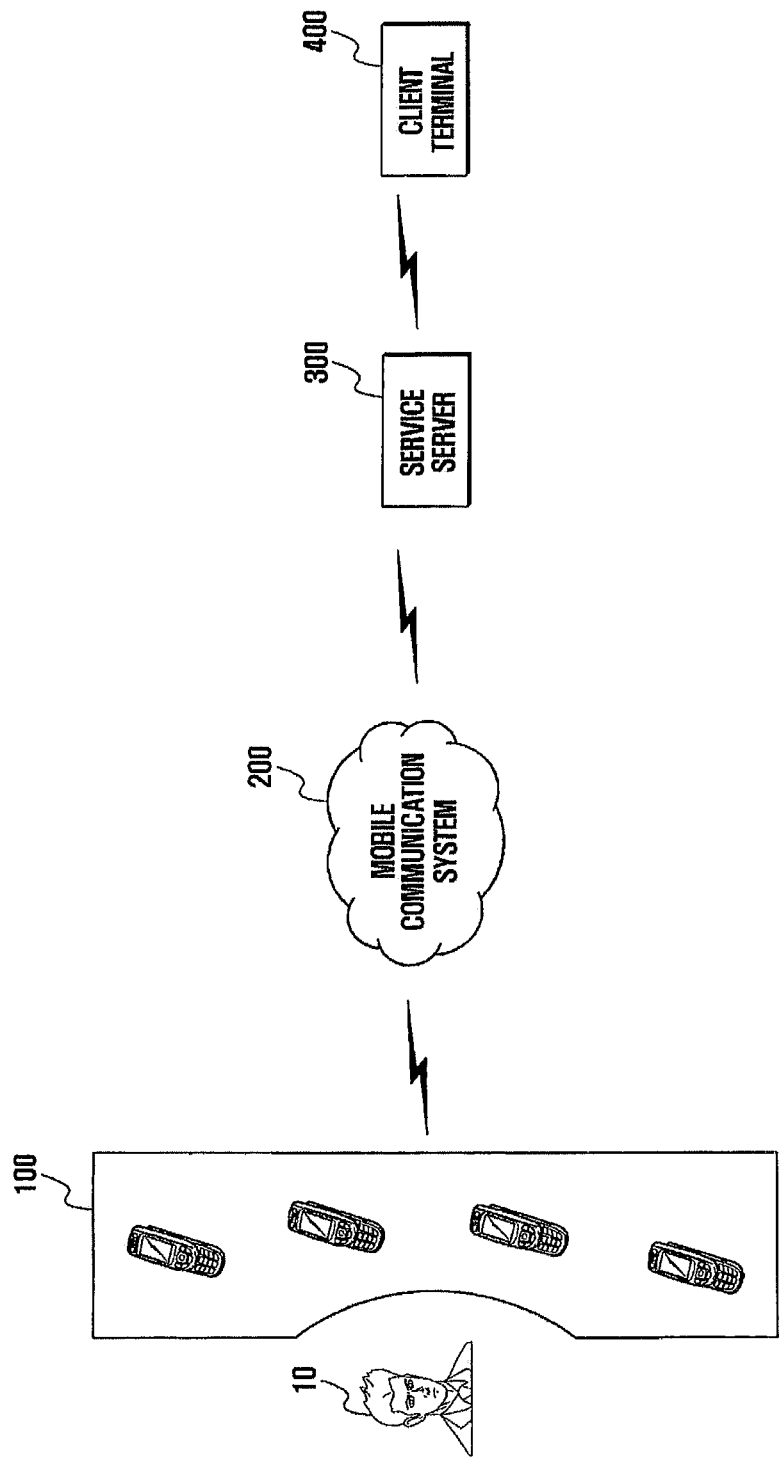
FIG. 1 is a schematic view showing a multi-view image service system in accordance with an exemplary embodiment of the present invention.

FIG. 1 is a schematic view showing a multi-view image service system in accordance with an exemplary embodiment of the present invention.

Referring to FIG. 1, a multi-view image service system includes a plurality of mobile communication devices 100, a mobile communication system 200, a service server 300, and a client terminal 400.

In this multi-view image service system, each mobile communication device 100 acquires moving images and transmits them to the service server 300 through the mobile communication system 200. The service server 300 edits the received moving images and creates multi-view images. When the client terminal 400 accesses and requests for downloading, the service server 300 transmits the created multi-view images to the client terminal 400. That is, the multi-view image service system can provide a multi-view image service to the client terminal 400. The following is a detailed description about respective elements.

The mobile communication device 100 obtains moving images of a photographing target 10, and sends them to the service server 300 via the mobile communication system 200. For this, each mobile communication device 100 may have a camera embedded therein. A synchronous signal used for photographing the target 10 may be received from the service server 300 or created through a short-distance wireless communication module in the mobile communication device 100. In the case of using a short-distance wireless communication module, the master device among the mobile communication devices 100 may receive a message about master certification from the service server 300. By selecting a group among neighboring mobile communication devices 100, the master device may set a group to acquire images for multi-view images. Then the master device produces setting information about a group and sends it to the service server 300. Also the master device receives, from the service server 300, a message about certification for the mobile communication devices 100 included in the setting information. This setting information includes hardware information, such as a specification of a camera, and location information between the mobile communication devices 100. If the mobile communication devices 100 are differently set in time from each other, the above setting information may include time information. This setting information becomes the basis by which the service server 300 creates a synchronous signal, and may also be used as information for assigning a server to process receiving images.

In the case where the mobile communication devices 100 use the IMS (IP multimedia subsystem) service, the mobile communication devices 100 may have a synchronous signal in common using a presence server supported by the IMS service. That is, the mobile communication devices 100 to acquire images for multi-view images may establish a communication channel with the presence server supported by the mobile communication network. Accordingly, these mobile communication devices 100 form a communication network around the presence server. Here, if the master device in a group to acquire images for multi-view images sends a synchronous signal, the presence server transmits a synchronous signal to each mobile communication device 100 to acquire images for multi-view images. On the other hand, the service server 300 can obtain information about the mobile communication devices 100 to acquire images for multi-view images by accessing the presence server. That is, when the master device collects information about other mobile communication devices and sends it to the presence server, the presence server transmits this information to the service server 300. Here, the master device can operate a short-distance wireless communication module to obtain information about mobile communication devices 100. After obtaining this information, the master device may remove a short-distance wireless communication network, but maintain a network using the presence server for the creation and transmission of a synchronous signal.

The mobile communication system 200 receives moving images from the mobile communication devices 100 and then transmits them to the service server 300. Also, the mobile communication system 200 relays a synchronous signal and a certification message both of which are transmitted from the service server 300 to the mobile communication devices 100. For this, the mobile communication system 200 may include base stations that form communication channels with the mobile communication devices 100, base station controllers that control the base stations, mobile switching centers that switch the base station controllers, and gateways that form communication channels with the service server 300. Furthermore, the mobile communication system 200 may include accounting units that set the pay per use of channels for a multi-view image service in the mobile communication devices 100. On the other hand, the service server 300 and the client terminal 400 may transmit and receive signals directly or via the mobile communication system 200. To support a multi-view image service, the mobile communication system 200 may be one of various communication networks such as 2G networks, 3G networks, mobile Internet networks, and so forth.

The service server 300 creates multi-view images by using moving images sent by the mobile communication devices 100, and then transmits the created multi-view images to the client terminal 400. Specifically, the service server 300 performs certification that decides whether or not the mobile communication devices 100 can use a multi-view image service. After certification, the service server 300 creates a synchronous signal so that the mobile communication devices 100 can take moving images to be converted into multi-view images, and then sends it to the mobile communication devices 100. Also, when receiving moving images from the mobile communication devices 100, the service server 300 creates multi-view images based at least partly on the redundancy of respective individual images. These multi-view images may be offered to the client terminal 400 upon request thereof.

The client terminal 400 establishes a communication channel with the service server 300 and downloads a variety of contents (i.e., multi-view images) the service server 300 provides. When receiving multi-view images, the client terminal 400 may use a download service or a streaming service according to the service type of the service server 300. Also, the client terminal 400 may form a variety of channels with the service server 300 according to its supportability. That is, depending on the types of the client terminal 400, the properties of a communication channel between the client terminal 400 and the service server 300 may be varied. For example, if the client terminal 400 is capable accessing the Internet through a cable or a wireless network, an Internet communication channel may be formed with the service server 300. If the client terminal 400 is a mobile communication device such as a mobile phone or a PDA, a mobile communication channel may be formed with the service server 300. Here, the client terminal 400 may be one of the aforesaid mobile communication devices 100.

As discussed above, the multi-view image service system can provide a multi-view image service for the photographing target 10 by creating multi-view images from moving images the mobile communication devices 100 collect, and by transmitting them to the client terminal 400. Hereinafter, further detailed description about respective elements of the system will be given with reference to the drawings.

Figure 2:
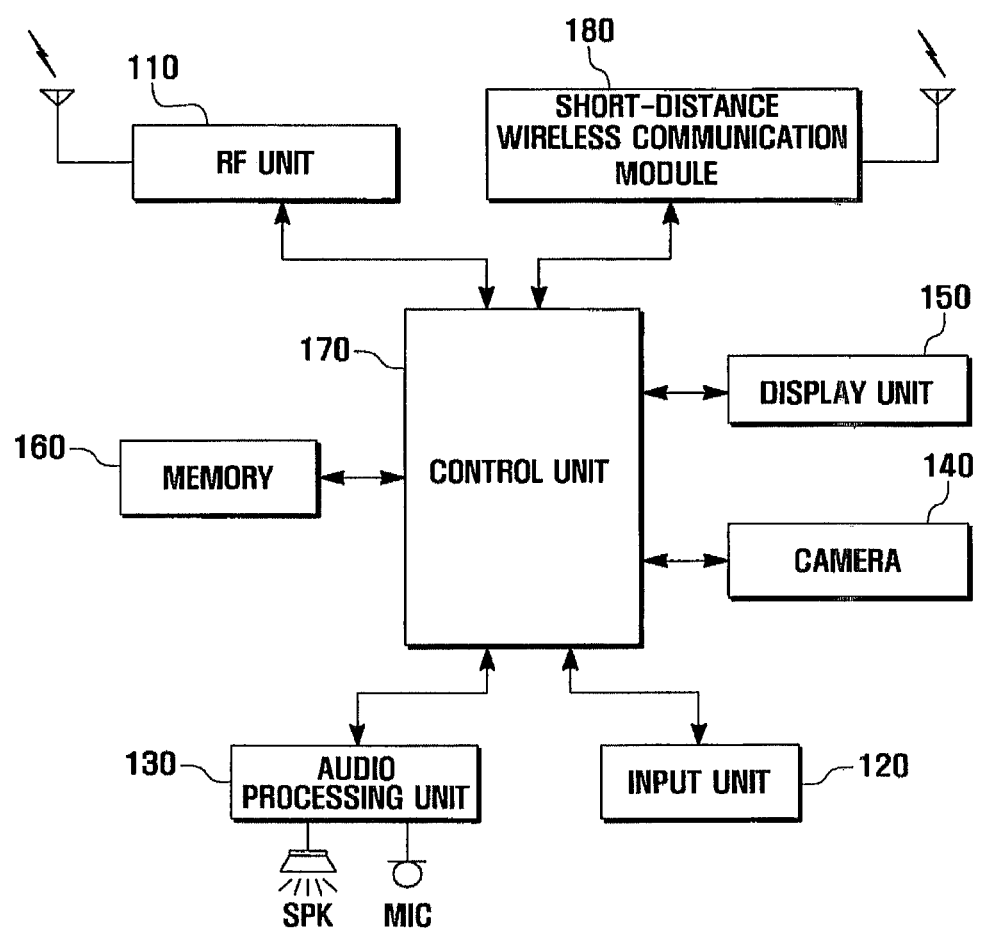
FIG. 2 is a block diagram showing a mobile communication device in accordance with an exemplary embodiment of the present invention.

FIG. 2 is a block diagram showing the mobile communication device 100 in accordance with an exemplary embodiment of the present invention.

Referring to FIG. 2, the mobile communication device 100 includes a radio frequency (RF) unit 110, an input unit 120, an audio processing unit 130, a camera 140, a display unit 150, a memory 160, and a control unit 170, and may further include a short-distance wireless communication module 180.

This mobile communication device 100 forms a communication channel with the service server 300, receives a message related to certification, and collects moving images in connection with other mobile communication devices. Then the mobile communication device 100 transmits images acquired by the camera 140 to the service server 300 through the mobile communication system 200. On the other hand, the mobile communication device 100 may play a role as the client terminal 400 by accessing the service server 300 and downloading contents related to multi-view images. The following is a detailed description about elements of the mobile communication device 100.

The RF unit 110 transmits and receives signals for multi-view images to the service server 300 through the mobile communication system 200. Specifically, the RF unit 110 establishes a communication channel for transmitting moving images with the mobile communication system 200, and receives a certification-related message, a synchronous signal, and so forth, that the service server 300 sends through the mobile communication system 200. Additionally, if the mobile communication device 100 is the client terminal 400, the RF unit 110 may form a communication channel for downloading multi-view images with the service server 300. For these, the RF unit 110 may include an RF transmitter that up-converts the frequency of transmitted signals and amplifies the transmitted signals, and an RF receiver that low-noise amplifies received signals and down-converts the frequency of the received signals.

The input unit 120 includes a number of alphanumeric keys and function keys arranged for efficient data entry. The function keys may have navigation keys, side keys, shortcut keys, and other kinds of specific keys. The input unit 120 creates key input signals related to user's setting or a function control of the mobile communication device 100, and then sends them to the control unit 170.

Particularly, the input unit 120 creates a key input signal for selecting an application program to acquire images for multi-view images, a key input signal for controlling the camera 140 in photographing for multi-view images, and a key input signal for controlling the operation of sending captured images to the service server 300. Additionally, if the mobile communication device 100 acts as the client terminal 400, the input unit 120 may create a key input signal for accessing the service server 300, a key input signal for appointing a specific multi-view image among plural multi-view images that the service server 300 offers, and a key input signal for downloading the appointed multi-view image.

The audio processing unit 130 outputs, through a speaker (SPK), audio signals received from the RF unit 110. Also, the audio processing unit 130 receives audio signals inputted from a microphone (MIC) and sends them to the control unit 170. Particularly, in photographing moving images, the audio processing unit 130 may collect audio signals around the photographing target 10. Additionally, in downloading multi-view images from the service server 300, the audio processing unit 130 may output audio signals in the downloaded multi-view images.

The camera 140 creates data signals by acquiring images and transmitting them to the control unit 170. These data signals may be temporarily or semi-permanently stored depending on a user's selection. The camera 140 may be automatically enabled under the control of the control unit 170 when an application program for a multi-view image service is enabled, and also automatically disabled together with disabling of the above application program. Images the camera 140 acquires may be transmitted in real-time to the service server 300 under the control of the control unit 170.

The display unit 150 displays various kinds of graphical information inputted by a user or offered to a user. For example, the display unit 150 provides graphical user interfaces such as a standby screen, hierarchical menu screens, a call screen, a message writing screen, and so forth. Particularly, the display unit 150 may display images acquired by the camera 140, multi-view images received from the outside, and a screen showing transmission of moving images. The display unit 150 may employ a liquid crystal display (LCD) device or other alternative display devices. The display unit 150 may be formed of a touch-screen, which performs also a part or all of the functions of the input unit 120.

The memory 160 stores a variety of application programs required for operation of the mobile communication device 100. Additionally, the memory 160 temporarily or semi-permanently stores images acquired by the camera 140, and also buffers images transmitted to the service server 300 or signals received from the service server 300. The memory 160 may consist of a program region and a data region.

The program region stores an operating system (OS) for booting the mobile communication device 100, an application program required for playing multi-view images, an application program for controlling the camera 140, an application program for creating multi-view images, and other optional application programs required for an audio replay function, an image or video replay function, and so forth. When there is a user's request for enabling one of the above functions, the program region offers the requested function using the corresponding application program under the control of the control unit 170.

The data region stores data created according to the use of the mobile communication device 100. Specifically, the data region may store still images or moving images acquired by the camera, phonebook data, audio data, metadata related to contents, and any other user-related data. Particularly, the data region may play a role as a buffer while moving images acquired by the camera 140 are transferred to the service server 300. Also, if the mobile communication device 100 operates as the client terminal 400, the data region may store multi-view images received from the service server 300. Additionally, if the mobile communication devices 100 are to use a multi-view image service, the data region may temporarily store a message related to master certification, information about group setting, and so forth.

The control unit 170 controls signal flows between the above-discussed elements, and provides control signals required for operation of the mobile communication device 100. Particularly, when the input unit 120 sends an input signal for enabling an application program for creating multi-view images, the control unit 170 controls enabling that application program stored in the memory 160. For creation of multi-view images, the control unit 170 of the master device causes the RF unit 110 to transmit signals for certification of multi-view image creation to the service server 300. Also, the control unit 170 may produce a list of mobile communication devices to acquire images for multi-view images. This list may be directly inputted into the master device, or alternatively produced on the basis of device information received while a short-distance wireless communication channel is formed using the short-distance wireless communication modules in the mobile communication devices. When this list is completed, the control unit 170 produces setting information for creating multi-view images by collecting information about each mobile communication device. This setting information may include device information, camera information and location information of the mobile communication device. To produce this setting information, the control unit 170 may collect necessary information through a short-distance wireless communication channel with the other mobile communication devices. Alternatively, this setting information may include device information only. Here, the service server 300 may acquire the other necessary information such as camera information from a specific server (for example, a home location register (HLR)) on the basis of device information. The control unit 170 transmits this setting information to the service server 300, and acquires the authority for certification of multi-view image creation from the service server 300. Here, the control unit 170 may receive a synchronous signal to control the camera 140 from the service server 300. The master device and the other devices may use this synchronous signal as a signal for taking moving images. When the mobile communication devices 100 form a short-distance wireless communication channel, the control unit 170 may produce and transmit a synchronous signal through a short-distance wireless communication channel to synchronize the camera 140 of each mobile communication device. For example, when receiving an input signal instructing image acquisition by the camera 140, the control unit 170 of the master device can synchronize the cameras 140 by transmitting a signal for enabling the camera 140 to the other mobile communication devices through a short-distance wireless communication channel and simultaneously enabling its own camera 140. Also, the control unit 170 may control the transmission of moving images to the service server 300 through the mobile communication system 200.

The short-distance wireless communication module 180 allows the establishment of short-distance communication channels between the mobile communication devices 100. The short-distance wireless communication module 180 may be a Bluetooth module, a Zigbee module, or any other alternative module. When an application program for creating multi-view images is enabled, the short-distance wireless communication module 180 may be enabled under the control of the control unit 170. Then the short-distance wireless communication module 180 forms a communication channel with neighboring mobile communication devices 100, and may transmit camera information, device location information, and device information (i.e., phone number, serial number, and so forth) to the short-distance wireless communication module 180 of the master device. For transmission of device location information, the mobile communication device may use location determination technique by the base station, or may further include a GPS module. In order to adjust synchronization of all the mobile communication devices 100 that take part in creation of multi-view images, the short-distance wireless communication module 180 may transmit a synchronous signal to the other mobile communication devices 100. This synchronous signal that the short-distance wireless communication module 180 transmits corresponds to a signal through which the master device controls the camera 140.

As discussed above, the mobile communication device 100 of the present invention has an application program for creating multi-view images, acquires multi-view images of the photographing target 10 by connecting with the other mobile communication devices, and transmits the acquired images to the service server 300. In addition, the mobile communication device 100 may play a role as the client terminal 400 by accessing the service server 300 and receiving multi-view images in a downloading or streaming type.

Figure 3A:
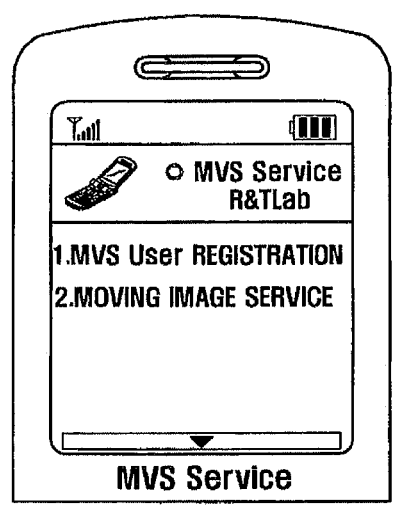
FIGS. 3A to 3D are example views showing graphical user interfaces of a mobile communication device in accordance with an exemplary embodiment of the present invention.
Figure 3B:
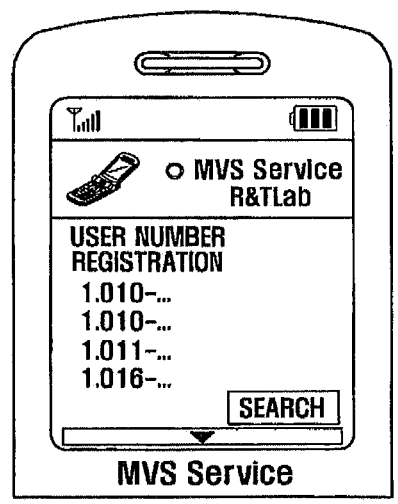
Figure 3C:
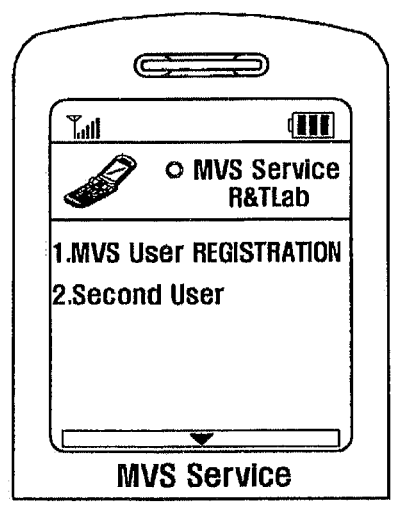
Figure 3D:
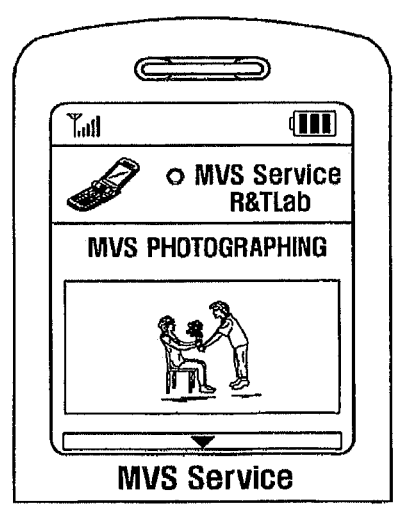

FIGS. 3A to 3D are example views showing graphical user interfaces of the mobile communication device in accordance with an exemplary embodiment of the present invention. Among them, FIGS. 3A and 3B show a graphical user interface of the master device, FIG. 3C shows that of the other devices except the master device, and FIG. 3D shows that of all the devices which take part in creation of multi-view images.

Referring to FIG. 3A, the master device offers a menu item for "user registration" of a multi-view image service on the display unit 150. Preferably, this menu item for user registration is linked to an application program for creating multi-view images so that this application program can be enabled by selecting a user registration menu. The display unit 150 of the master device may further display another menu item for "moving image service" that allows downloading and watching multi-view images from the service server 300. When a moving image service menu is enabled, the mobile communication device accesses the service server 300, downloads and displays a web page the service server 300 provides. Thereafter, when multi-view images are selected among various contents displayed in the display unit 150, the mobile communication device provides, on the display unit, a download screen of multi-view images or, in case of streaming, multi-view images in real time.

If the creation of multi-view images is certified by the service server 300, the master device registers mobile communication device to take part in the creation of multi-view images. For this, as shown in FIG. 3B, the master device offers a menu for "user number registration" on the display unit. This menu is for registering the phone numbers of participant devices. These phone numbers may be directly inputted in the master device, or selected in a phonebook. Alternatively, these phone numbers may be inputted from device information that the mobile communication devices transmit through a short-distance wireless communication channel. After the user number registration of the mobile communication devices to take part in the creation of multi-view images is completed, the master device produces setting information on the basis of information about the registered devices, and then transmits this setting information to the service server 300. Depending on this setting information, the service server 300 checks the states of currently available processing servers, and then, if processing is possible, transmits a message related to group certification to the mobile communication devices 100.

Upon receiving a message related to group certification allowing creation of multi-view images from the service server 300, the mobile communication device 100 may display a message related to "multi-view image group certification" by using a window such as a pop-up as shown in FIG. 3C. Then the mobile communication device 100 may remove the displayed message when "OK" is selected. Simultaneously, the camera 140 of each mobile communication device 100 is enabled and then obtains a preview image of a photographing target. So, the display unit 150 can display such a preview image. Thereafter, once the master device sends a signal to take moving images required for creating multi-view images, the mobile communication devices 100 collect images of a photographing target and then display them on the display unit 150 as shown in FIG. 3D. Alternatively, the mobile communication devices 100 may perform photographing of moving images by using, as a synchronous signal, the time when each mobile communication device 100 receives a multi-view image group certification signal from the service server 300.

Figure 4:
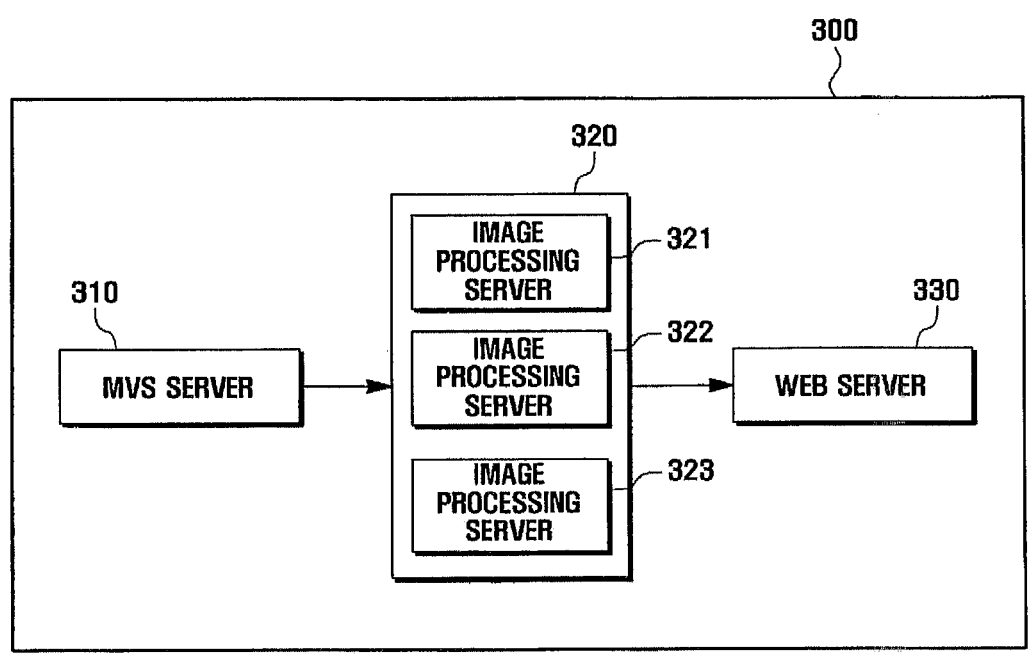
FIG. 4 is a block diagram showing a service server in accordance with an exemplary embodiment of the present invention.

FIG. 4 is a block diagram showing the service server 300 in accordance with an exemplary embodiment of the present invention.

Referring to FIG. 4, the service server 300 includes an MVS (multi-view service) server 310, at least one image processing server 320, and a web server 330.

The MVS server 310 transmits a certification-related message to the mobile communication devices 100, and receives moving images required for creating multi-view images from the mobile communication devices 100. In addition, the MVS server 310 checks whether there is a currently available one among the image processing servers 320, and then transmits moving images to the available image processing server 320. For this, the MVS server 310 may include a certification server and a database. The certification server stores information about the mobile communication devices 100 available for a multi-view image service. The database stores information about each image processing server 320 to check a resource state and a current state of each image processing server 320.

The certification server may be disposed within the mobile communication system 200 in another network design. The certification server stores phone numbers of the mobile communication devices 100 available for a multi-view image service. Additionally, the certification server receives setting information (i.e., information about the mobile communication devices 100 that take part in creation of multi-view images) and also estimates the capacity of the image processing server 320 required for the mobile communication devices 100 listed in setting information. Then the certification server checks whether there is a currently available image processing server 320 by referring to the database storing information about the image processing servers 320, and then, if there is a available server 320, transmits a multi-view image group certification message to each mobile communication device. If there is no available image processing server, the certification server may transmit a message of non-available service to each mobile communication device. After certification is made and moving images are received from the mobile communication devices 100, the MVS server 310 transmits the received moving images to the image processing server 320. Here, the MVS server 310 may form a direct route for moving image transmission from the mobile communication devices 100 to the image processing server 320 through a direct communication link therebetween.

The image processing server 320 transmits information about its own resource state and current state to the MVS server 310. Creating multi-view images consumes some amount of resources. So, if a specific server has already supported a multi-view image service of the other mobile communication devices, that server will have increasing loads. In order to disperse such increasing loads, it is desirable that each image processing server 320 updates information about its own state to the database of the MVS server 310 in real time or according to event occurrence. Also, by directly communicating with the mobile communication devices 100 performing a multi-view image service without passing through the MVS server 310, the image processing servers 320 can not only realize a high-speed receiving of moving images, but also reduce the load of the MVS server 310. FIG. 4 shows three exemplary image processing servers 321, 322 and 323, but the present invention is not limited to the specific number of the image processing servers. That is, the present invention may employ much more image processing servers, or may use only a single image processing server with good performance. On the other hand, the image processing server 320 encodes the received images based at least partly on redundancy (i.e., unnecessary repetition, between the received images). Specifically, if the received images have redundancy greater than a predefined ratio, the image processing server 320 encodes the received images using a specific codec such as 3DAV MVC (3-dimensional audio video multi-view codec). If the received images have redundancy smaller than a predefined ratio, the image processing server 320 encodes the received images using another specific codec such as MPEG4/AVC (moving picture experts group 4 audio video codec). That is, the image processing server 320 compresses and encodes each received image, which has redundancy greater than a predefined ratio, based at least partly on redundancy, thus reducing the capacities of all multi-view images. Also, the image processing server 320 encodes separately each received image, which has redundancy smaller than a predefined ratio, and converts the encoded images into multi-view images. Therefore, when the received images have redundancy smaller than a predefined ratio, the image processing server 320 does not perform enormous calculation and unspecified compensation required for redundancy consideration. This not only reduces a system load, but also allows exact and efficient encoding for images with a lower degree of association.

The web server 330 controls access to the client terminal 400, and also transmits multi-view images to each client terminal 400 in response to its request. If the client terminal 400 requests specific multi-view images in a downloading type, the web server 330 transmits the requested multi-view images through an available channel. Here, the requested multi-view images may be selected from multi-view images which have different playing positions and are included in contents of the web server 330. Alternatively, the client terminal 400 may request a content having multi-view images in a streaming type. Here, if the client terminal 400 selects multi-view images for a specific scene, the web server 330 receives a selection signal from the client terminal 400 and then streams corresponding multi-view images to the requesting client terminal 400. That is, the web server 330 can provide specific multi-view images only at a desired playing position that the client terminal 400 requests.

Heretofore, described is the multi-view image service system according to an exemplary embodiment of the present invention. Hereinafter, a multi-view image service method according to an exemplary embodiment of the present invention will be described.

Figure 5:
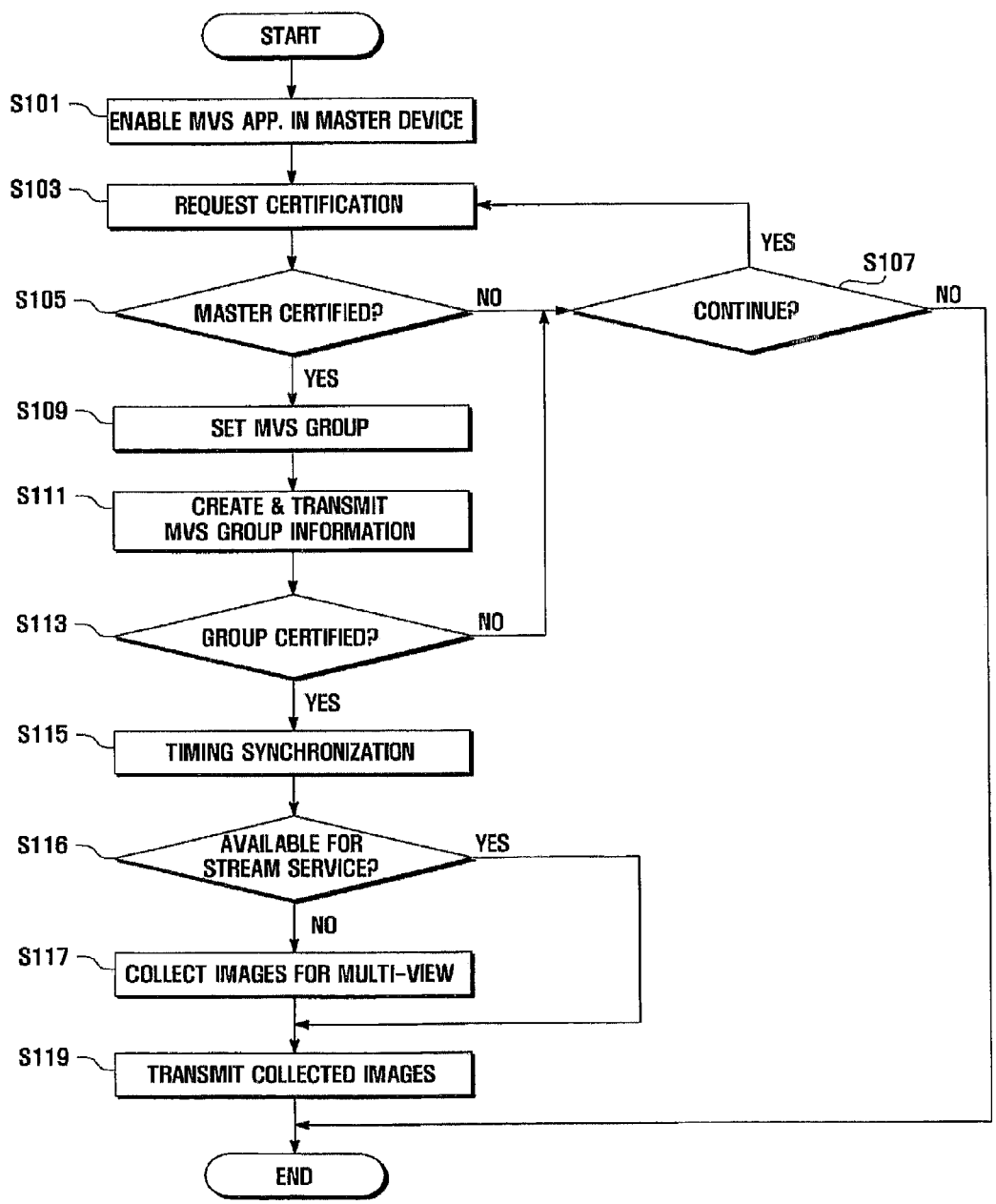
FIG. 5 is a flow diagram showing a method for acquiring individual images for multi-view images in a mobile communication device in accordance with an exemplary embodiment of the present invention.

FIG. 5 is a flow diagram showing a method for acquiring individual images for multi-view images in a mobile communication device in accordance with an exemplary embodiment of the present invention.

Referring to FIG. 5, in a step S101, the master device among the mobile communication devices 100 enables an application program (MVS App.) for creating multi-view images in response to a user's input. Then, in a step S103, the master device transmits a message for requesting certification of a multi-view image service to the service server 300 through the mobile communication system 200. Alternatively, this message may be sent to a certification server in the mobile communication system 200.

Next, in a step S105, the master device checks whether the master authority is certified. If not certified, the master device determines, in a step S107, whether to continue a multi-view image service. Then the master device returns to the previous step S103 for continuation, or otherwise comes to an end. Certification of the master authority checks whether the master device has been admitted to a multi-view image service. The certification server has service registration records of the mobile communication devices. When receiving a request for certification from one of the devices, the certification server determines the validity of certification and offers the result of the determination to the requesting device.

If the master authority is certified in the aforesaid step S105, the master device sets a group for multi-view image service (MVS) together with other suitable devices in a step S109. This is to group the mobile communication devices to take part in creation of multi-view images. For this, the master device allows directly inputting phone numbers of other devices or selecting those stored in a phonebook. Alternatively, the master device may acquire phone numbers of other devices through the short-distance wireless communication module.

After grouping, the master device collects device information from other devices, creates group information of a multi-view image service, and transmits the group information to the service server 300 in a step S111. The device information may include phone number information only or may further include camera specification information, device location information, and so forth. Even though the device information includes phone numbers only, the service server 300 may acquire other necessary information on the basis of phone numbers of the devices.

Next, in a step S113, the mobile communication devices 100 checks whether a group certification is allowed from the MVS server of the service server 300. If not allowed, the devices return to the aforesaid step S105. The group certification means that the service server 300 estimates the size of images to be received, depending on the resolution or size of images that the devices 100 acquire, and then checks whether there is an image processing server capable of processing the estimated images. If there is an available image processing server, the devices 100 receives a group certification message from the service server 300. Then, in a step S115, the mobile communication devices 100 perform timing synchronization for creating multi-view images. This timing synchronization adjusts the time when the camera of each device 100 starts to photograph. If the short-distance wireless communication channel is formed, the mobile communication devices 100 can transmit and receive a synchronous signal through the short-distance wireless communication channel. Alternatively, the timing synchronization may be performed according to a synchronous signal the MVS server of the service server 300 offers.

After the timing synchronization, in a step S117, the mobile communication devices 100 start to collect individual images for multi-view images when receiving a control or synchronous signal from the master device. Then, in a step S119, the devices 100 transmit the collected images to the service server 300. Here, the devices 100 may send in real time the collected images directly to a specific image processing server 320 of the service server 300. Furthermore, the aforesaid step S117 may be performed only if the service server is not available for a stream service. If it is determined in a step S116 that the service server is available for a stream service, the aforesaid step S117 may be omitted.

As discussed above, each mobile communication device 100 obtains certification of a multi-view image service, and sets a group for a multi-view image service together with other devices. Preferably, each mobile communication device 100 sends its own camera information to the service server 300 so that the collected images can be processed in a suitable image processing server.

Figure 6:
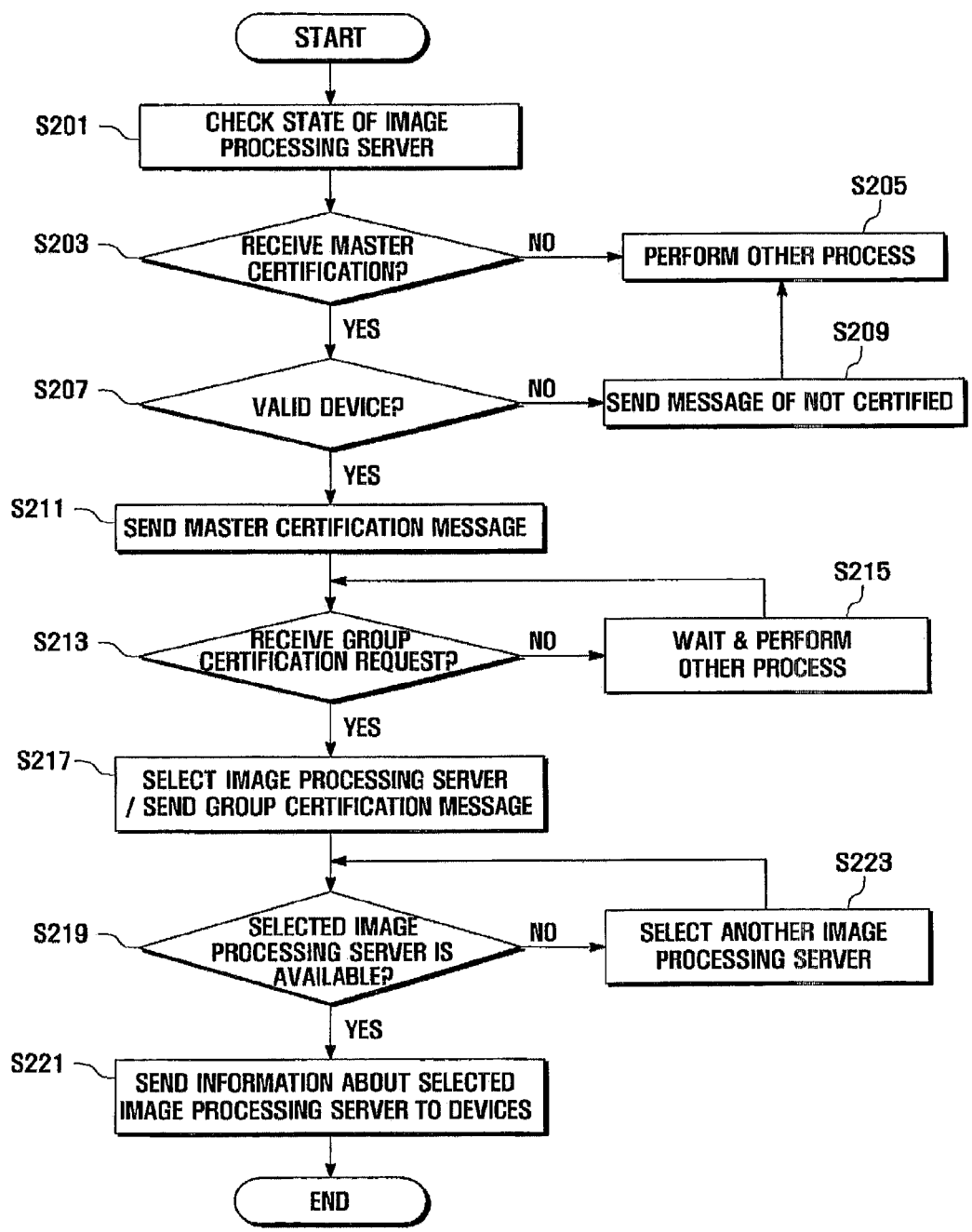
FIG. 6 is a flow diagram, showing a method for operating a service server in accordance with an exemplary embodiment of the present invention.

FIG. 6 is a flow diagram showing a method for operating a service server in accordance with an exemplary embodiment of the present invention.

Referring to FIG. 6, in a step S201, the MVS server 310 checks the state of the image processing server 320. For this, the MVS server 310 may preferably include a separate database to store and update information about the state of each image processing server 320. This server state information may include a resource state and a currently used state of each image processing server 320. Each image processing server 320 updates information stored in the database in real time or according to event occurrence, and the MVS server 310 may check, depending on information stored in the database, whether each image processing server 320 is currently available.

Next, in a step S203, the MVS server 310 checks whether it has received a master certification request from the master device. Unless there is a certification request, the MVS server 310 performs other suitable process such as database management in a step S205. If there is a certification request, the MVS server 310 checks the validity of the requesting device in a step S207. The validity of the device is determined depending on whether a device requesting master certification has been admitted to a multi-view image service. Therefore, by using the certification server that stores phone numbers of devices admitted to a multi-view image service, the MVS server 310 can check the validity of the certification-requesting device. If the certification-requesting device is not valid, the MVS server 310 sends a message of "not certified" to the requesting device in a step S209.

If the certification-requesting device is valid, the MVS server 310 transmits a message of master certification to the requesting device (i.e., the master device) in a step S211. Then, in a step S213, the MVS server 310 checks whether it has received a group certification request for creating of multi-view images. Unless there is a group certification request, the MVS server 310 waits for a specific time while performing other suitable process such as database management in a step S215, and then returns to the previous step S213. The group certification request may correspond to reception of setting information from the mobile communication devices 100 including the master device. This setting information may include device information, camera information and location information of the mobile communication devices 100 which will acquire images for creating multi-view images. Depending on the setting information, the MVS server 310 selects, in a step S217, one or more image processing servers 320 being capable of processing the moving images which the mobile communication devices 100 will offer. After selection, the MVS server 310 transmits a group certification message to the mobile communication devices 100.

Next, in a step S219, the MVS server 310 determines whether the selected image processing server 320 is available. If available, the MVS server 310 sends information about the selected image processing server 320 to the mobile communication devices 100 in a step S221. If not available, the MVS server 310 selects another image processing server in a step S223 and returns to the aforesaid step S219.

Figure 7:
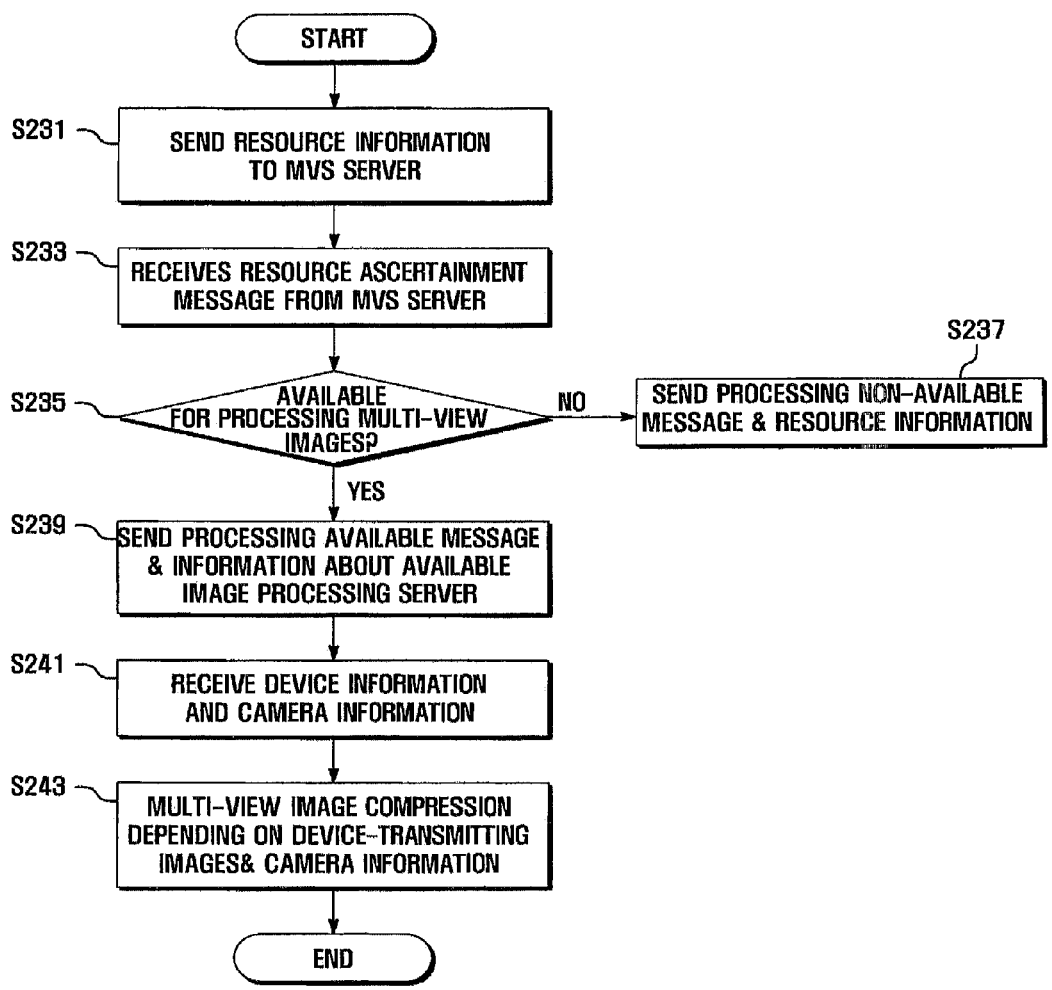
FIG. 7 is a flow diagram showing a method for operating an image processing server in accordance with an exemplary embodiment of the present invention.

FIG. 7 is a flow diagram showing a method for operating an image processing server in accordance with an exemplary embodiment of the present invention.

Referring to FIG. 7, in a step S231, each image processing server 320 sends its own resource information to the MVS server 310. Then the MVS server 310 ascertains resource information of each image processing server 320 and sends a resource ascertainment message to the image processing server 320. Thus the image processing server 320 receives the resource ascertainment message from the MVS server 310 in a step S233.

Next, in a step S235, the image processing server 320 determines whether to be available for processing multi-view images. If not available, the image processing server 320 creates a processing non-available message and sends it to the MVS server 310 together with resource information in a step S237.

If available, the image processing server 320 creates a processing available message and sends it to the MVS server 310 together with information about available image processing servers in a step S239. Then the MVS server 310 sends device information and camera information to the image processing server 320, and therefore the image processing server 320 receives such information from the MVS server 310 in a step S241.

Next, in a step S243, the image processing server 320 performs the compression of multi-view images, depending on images transmitted from the devices and camera information of each device. The compression and editing of multi-view images will be described later with reference to FIG. 8. After editing, the image processing server 320 sends the edited images to the web server 330, which then sends the received images to the client terminal 400 that requested multi-view images. Here, the web server 330 may provide multi-view images to the client terminal 400 in a downloading or streaming type.

On the other hand, while receiving images from each device, the image processing server 320 may perform a notifying function if some devices fail to transmit images. Specifically, if there is no transmission of images from a specific device, the image processing server 320 makes an index (e.g., a phone number) of the corresponding device and also creates a notification message that an image transmission failed. Then the image processing server 320 sends this notification message to the master device or any other slave devices. If a new image is received from a transmission-failed node, the image processing server 320 performs the compression of multi-view images by using the newly received image together with images of other devices.

After the compression of multi-view images, the image processing server 320 may send its own current resource information to the MVS server 310 to update resource information. Therefore, the MVS server 310 can judge which image processing server is available for the compression of multi-view images.

As discussed above, the service server 300 allows the mobile communication devices 100 to be connected with the suitable image processing server 320 through the MVS server 310, and also effectively provides multi-view images to the transmission-requesting client terminal 400 through the web server 330.

Figure 8:
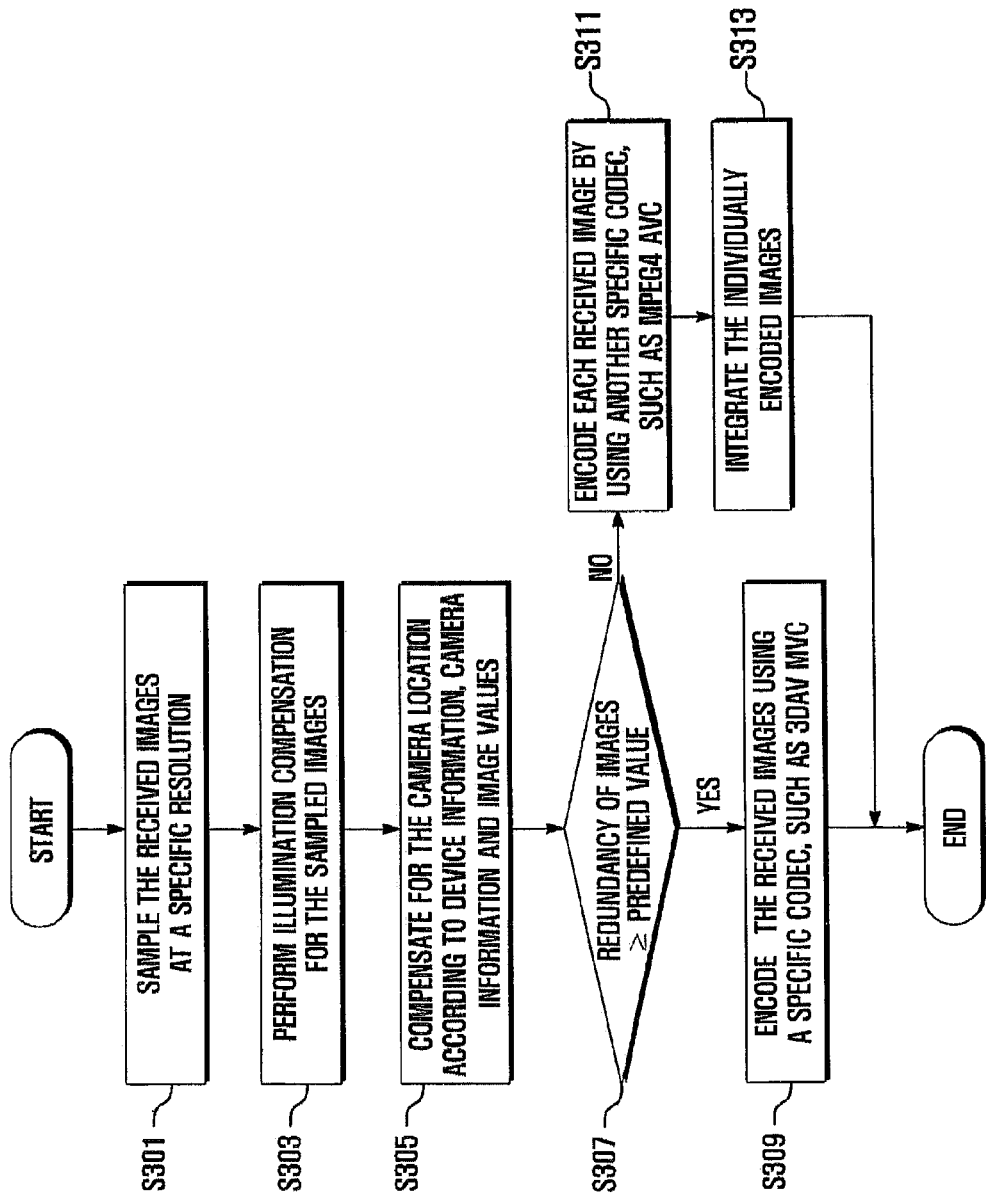
FIG. 8 is a flow diagram showing a method for converting multi-view images in accordance with an exemplary embodiment of the present invention.

FIG. 8 is a flow diagram showing a method for converting multi-view images in accordance with an exemplary embodiment of the present invention.

Referring to FIG. 8, in a step S301, the image processing server 320 samples the received images at a specific resolution. This sampling of the images may be performed using camera information stored in setting information of the mobile communication devices 100. That is, the image processing server 320 may perform a sampling on the basis of images taken by the lowest resolution camera or alternatively by a specific resolution camera. For this, the image processing server 320 performs compensation and interpolation for images taken by the camera so as to make their resolution uniform by increasing a resolution of images with a low resolution or by decreasing a resolution of images with a high resolution. The standard for sampling may vary according to system designer's intention or network resource state.

Next, in a step S303, the image processing server 320 performs illumination compensation for the sampled images. While the mobile communication device 100 acquires images of the photographing target, illumination may be varied in general according to angle and direction to the target. It is therefore desirable to compensate for illumination for each image. In illumination compensation, the image processing server 320 extracts the mean value of images by filtering each image, and then adjusts an illumination value of each image on the basis of the mean value. For this, the image processing server 320 may use illumination compensating technique supported by a specific codec such as MPEG4 or 3DAV.

After illumination compensation, in a step S305, the image processing server 320 compensates for the camera location according to device information, camera information and image values. Specifically, when a number of cameras take pictures at various angles to the specific target, right and left positions in each image may be varied, and also upper and lower positions to the photographing target may be varied. Therefore, in order to allow for compensation, the image processing server 320 acquires information about device locations through a GPS module or by using calculation technique of base stations, acquires information about dynamic locations on the basis of camera performance information, and estimates image-taken locations by comparing image patterns of each image. In a comparison of image patterns, the image processing server 320 extracts edges by filtering the received images, and compares the extracted edges with each other.

The aforesaid steps S301 to S305 correspond to pre-processing steps performed in the image processing server 320. Such pre-processed images do not require further processing in a coding step, thus allowing much faster image processing.

After compensating for setting information, the image processing server 320 calculates redundancy between the received images, and then determines whether the calculated redundancy of images is greater than or equal to a predefined value in a step S307. If redundancy is greater than or equal to a predefined value, the image processing server 320 encodes in a step S309 the received images using a specific codec, such as 3DAV MVC, that considers redundancy.

If redundancy is smaller than a predefined value, the image processing server 320 encodes individually in a step S311 each received image by using another specific codec, such as MPEG4 AVC, that does not consider redundancy. The individually encoded images are integrated in a step S313.

As discussed above, the multi-view image conversion method of the present invention includes performing illumination compensation and dynamic compensation to the received images, calculating an amount of redundancy, and encoding the received images through codec with or without consideration to redundancy. Therefore, this multi-view image conversion method may improve a resolution of multi-view images and also optimize a size of resultant multi-view images.

Figure 9:
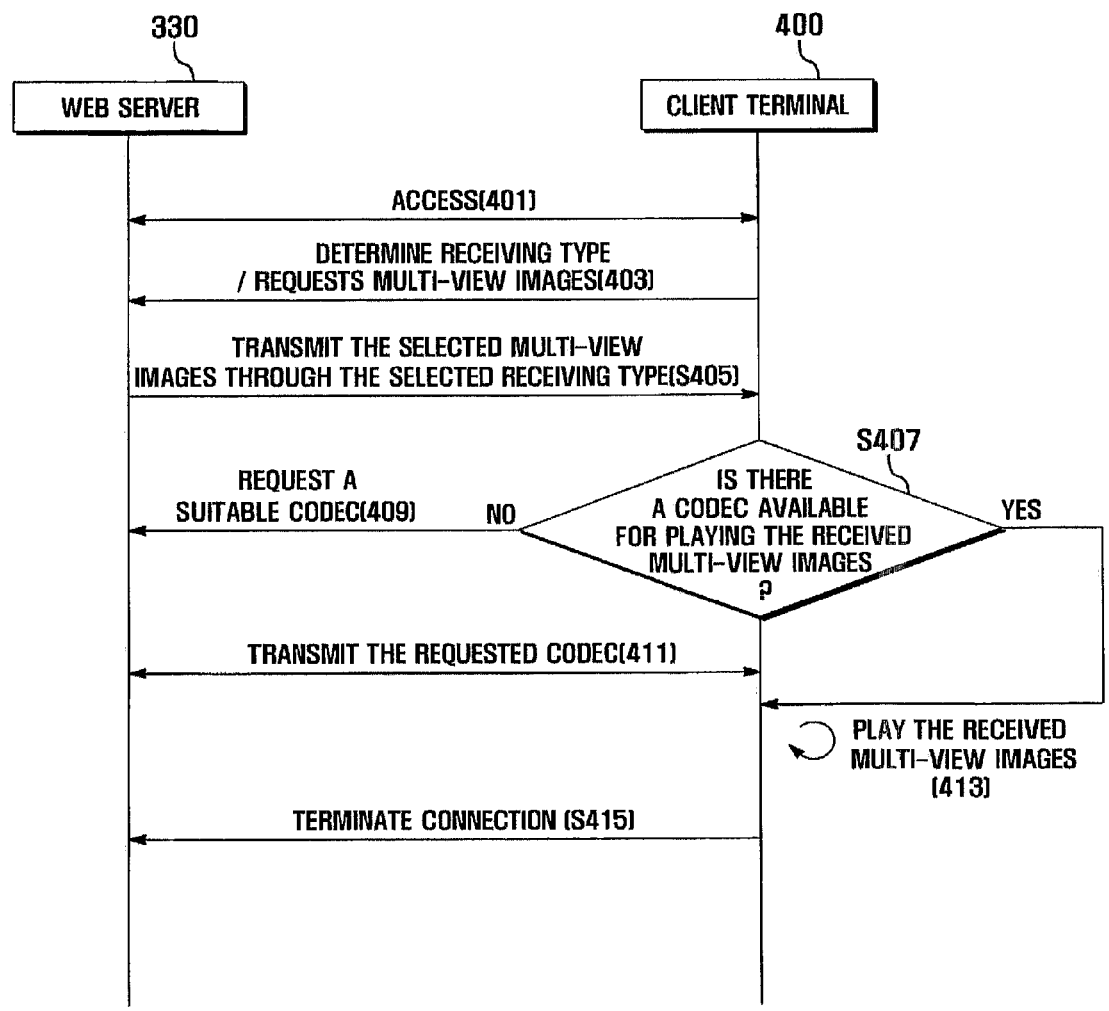
FIG. 9 is a flow diagram showing a method for transmitting and receiving multi-view images in accordance with an exemplary embodiment of the present invention.

FIG. 9 is a flow diagram showing a method for transmitting and receiving multi-view images in accordance with an exemplary embodiment of the present invention.

Referring to FIG. 9, in a step S401, a communication channel is established between the web server 330 and the client terminal 400, and the client terminal 400 accesses the web server 330. Here, the client terminal 400 may allow a variety of access to the web server 330 according to a communication system of the web server 330. That is, if the web server 330 is based on a mobile communication system, the client terminal 400 can access the web server 330 through a mobile communication channel. Additionally, if the web server 330 is based on Internet, the client terminal 400 can access the web server 330 through a cable or a wireless network using access points.

Next, in a step S403, the client terminal 400 requests multi-view images from the web server 330 and also determines a receiving type for multi-view images. When the client terminal 400 accesses the web server 330, the web server 330 provides a web page allowing a selection of multi-view images. Therefore, the client terminal 400 can select specific images among various multi-view images included in a web page. Additionally, the client terminal 400 can select a receiving type between a downloading type and a streaming type.

In a step S405, the web server 330 transmits the selected multi-view images to the client terminal 400 through the selected receiving type.

Next, in a step S407, the client terminal 400 checks whether a codec is available for playing the received multi-view images. If there is no available codec, the client terminal 400 requests a suitable codec from the web server 330 in a step S409, and then receives the requested codec from the web server 330 in a step S411. If a codec is available, or after receiving the requested codec, the client terminal 400 plays the received multi-view images in a step S413. Here, the client terminal 400 may play such images in different manner according to its service type.

Specifically, in case of using a downloading type, the client terminal 400 downloads the whole information related to the multi-view images, and then plays the completely downloaded images. If a user desires to see multi-view images for a specific scene, the client terminal 400 selects and plays the desired multi-view images among images downloaded and stored in the memory 160. Therefore, the client terminal 400 using a downloading type can provide all the multi-view images to a user without ceasing.

Alternatively, in case of using a streaming type, the client terminal 400 receives parts of the requested multi-view images, and then plays in real time the received images while still receiving the other parts. If a user desires to see multi-view images for a specific scene, the client terminal 400 reports it immediately to the web server 330 and then receives and plays the desired multi-view images. Therefore, the client terminal 400 using a streaming type can selectively provide a user's desired multi-view images with enhanced receiving speed and saved receiving capacity.

After completing a play of multi-view images, in a step S415, the client terminal 400 disconnects a communication channel with the web server 330, returns network resources, and terminates a connection.

As discussed above, the method for transmitting and receiving multi-view images may allow the client terminal 400 to offer various multi-view image services according to a user's preference.

FIG. 10 is an example view showing a photographing method using mobile communication devices in accordance with an exemplary embodiment of the present invention. This example shown in FIG. 10 employs three devices for photographing.

Referring to FIG. 10, a photographing target is some persons who stands in a line. The master device takes moving images of the target as indicated by 150m. Here, the first slave device on the left of the master device photographs at a different angle from the master device, so the first slave device can obtain leftward images of the target as indicated by 150a. Similarly, the second slave device on the right of the master device can photograph rightward images of the target as indicated by 150b.

In this circumstance, the master device transmits some partial image blocks of its own image 150m to the slave devices. Specifically, a first image block (Ma) at a left side of the entire image is sent to the first slave device, and a second image block (Mb) at a right side of the entire image is sent to the second slave device. The first slave device detects, from its own image 150a, a third image block (Aa) matched with the first image block (Ma). Similarly, the second slave device detects a fourth image block (Bb) matched with the second image block (Mb) from its own image 150b. Here, the detected image block should have a matching ratio more than a specific value. That is, if a certain part of the entire image has a similarity more than a specific ratio in comparison with the image block received from the master device, each slave device considers that part as a similar image block.

Additionally, each slave device may determine degree of image discordance by comparing a standard block (i.e., the first block or the second block) with a compared block (i.e., the third block or the fourth block). This comparison is to examine where similar parts between the standard block and the compared block are distributed in the compared block. For example, the first slave device can determine that the third block (Aa) leans toward the lower part of the target by a comparison between the third block (Aa) and the first block (Ma). Similarly, the second slave device can determine that the fourth block (Bb) leans toward the lower part of the target by a comparison between the fourth block (Bb) and the second block (Mb). The following description uses an example of the first slave device.

If it is determined that the third block (Aa) leans toward the lower part of the target in comparison with the first block (Ma), the control unit of the first slave device may display an icon or an indicator 11 for an upward movement of a camera focus on a display image 751. Therefore, a user can adjust a camera focus to move upward. On the contrary, if the third block (Aa) leans toward the upper part of the target in comparison with the first block (Ma), the control unit of the first slave device may display another indicator for a downward movement of a camera focus.

Additionally, if the data volume of the image 150m taken by the master device is too great for the slave device to receive, the master device may establish standard blocks from partial regions of the entire image 150m and transmit them to the slave devices periodically or in real time.

From the detection of a similar block by comparing a current image with the standard blocks received periodically or in real time, each slave device may enhance the degree of correlation between a currently acquired image and the image received from the mater device. Furthermore, in addition to the above-discussed upward or downward indicator, the slave device may display indicators for leftward and rightward movements of a camera focus. That is, if a certain block received from the master device has a matching ratio less than a specific value (e.g., 70% or 50%), the slave device may determine that the acquired image leans toward the left or right part of the target and then may display a suitable indicator for a corresponding movement of a camera focus.

On the other hand, the slave device may reduce a burden of calculation through PSNR measurement in the detection of similar blocks. Additionally, to further reduce such a burden, the slave device may divide the standard block received from the master device into several sub-blocks, select one of them, and detect an image block matched with the selected sub-block.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a multi-view image service, the method comprising:
   receiving images of parts of a specific target captured at various angles;
   estimating locations of devices capturing the images where the images were captured by comparing image patterns in each of the images;
   determining a redundancy among the received images;
   in response to comparing the determined redundancy and a threshold value, encoding the image data for at least one of the received images using a multi-view codec;
   creating at least one multi-view image by integrating the received images based at least partially on the estimated locations of the devices;
   determining whether a receiving type of the at least one multi-view image is a downloading type or a streaming type in response to a request for transmitting the at least one multi-view image;
   if the receiving type is the downloading type, transmitting, to a mobile communication device, the at least one multi-view image; and
   if the receiving type is the streaming type, transmitting, to the mobile communication device, a single multi-view image among the at least one multi-view image in response to request for the single multi-view image.

2. The method of claim 1 further comprising:
   in response to determining that the redundancy is less than the threshold, encoding the received images using a codec that does not include a consideration for redundancy among the received images.

3. The method of claim 1 further comprising:
performing illumination compensation for the received images.

4. The method of claim 1 wherein the received images correspond to at least one of a right, left, upper, lower and center side of the specific target.

5. The method of claim 1 further comprising:
receiving a selection of specific images among various multi-view images; and
providing new multi-view images corresponding to the selection of specific images.

6. The method of claim 5 wherein at least one of the multi-view images and the new multi-view images is provided through a web page.

7. The method of claim 5 further comprising:
receiving the multi-view images by the mobile communication device; and
displaying the multi-view images by the mobile communication device.

8. The method of claim 7 further comprising:
selecting a content including the multi-view images by the mobile communication device;
selecting the receiving type for receiving the content by the mobile communication device; and
receiving the content according to the selected receiving type.

9. The method of claim 8, wherein displaying the multi-view images includes:
if the content is received through the downloading type, displaying the multi-view images among images downloaded and stored in a memory.

10. The method of claim 8, wherein displaying the multi-view images includes:
if the content is received through the streaming type, sending a request to a server that provides the content;
receiving the multi-view images from the server through the streaming type; and
displaying the received multi-view images.

11. A system for a multi-view image service, the system comprising:
a multi-view service unit configured to receive images of parts of a specific target captured at various angles; and
an image processing unit configured to estimate locations of devices capturing the received images where the images were captured by comparing image patterns in each of the received images; determine a redundancy among the received images; in response to comparing the determined redundancy and a threshold value, encode the image data for at least one of the received images using a multi-view codec; and create at least one multi-view image by integrating the received images based at least partially on the estimated locations of the devices; calculate a redundancy among the received images and the multi-view codec determine whether a receiving type of the at least one multi-view image is a downloading type or a streaming type in response to request for transmitting the at least one multi-view image; if the receiving type is the downloading type, transmit, to a mobile communication device, the at least one multi-view image; and if the receiving type is the streaming type, transmit, to the mobile communication device, a single multi-view image among the at least one multi-view image in response to request for the single multi-view image.

12. The system of claim 11, wherein the image processing unit is configured to encode, in response to the redundancy being less than the threshold, the received images using a codec that does not include a consideration for redundancy among the received images.

13. The system of claim 11, wherein the image processing unit is configured to perform illumination compensation for the received images.

14. The system of claim 11, wherein the received images correspond to at least one of a right, left, upper, lower and center side of the specific target.

15. The system of claim 11, wherein the image processing unit is configured to extract edges by filtering the received images, compare the extracted edges with each other, and integrate the received images by using the compared edges.

16. The system of claim 11, further comprising:
a web service unit configured to provide new multi-view images corresponding to a selection of specific images, when a selection of specific images among various multi-view images is received from a client terminal.

17. The system of claim 16, wherein the mobile communication device is configured to receive the multi-view images by the mobile communication device and play the multi-view images by the mobile communication device.

18. The system of claim 16, wherein the mobile communication device is configured to select a content including the multi-view images, select the receiving type for receiving the content, and receive the content according to the selected receiving type.

19. The system of claim 17, wherein the mobile communication device is configured to:
if the content is received through the downloading type, display the multi-view images among images downloaded and stored in a memory; and
if the content is received through the streaming type, send a request to a server that provides the content, receive the requested multi-view images from the server through the streaming type, and display the received multi-view images.

20. A memory including instructions stored thereon, that when executed, cause a device to:
receive images of parts of a specific target captured at various angles;
estimate locations of devices capturing the images where the received images were captured by comparing image patterns in each of the images;
determine a redundancy among the received images;
in response to comparing the determined redundancy and a threshold value, encode the image data for at least one of the received images using a multi-view codec;
create at least one multi-view image by integrating the received images based at least partially on the estimated locations of the devices;
determine whether a receiving type of the at least one multi-view image is a downloading type or a streaming type in response to request for transmitting the at least one multi-view image;
if the receiving type is the downloading type, transmit, to a mobile communication device, the at least one multi-view image; and
if the receiving type is the streaming type, transmit, to the mobile communication device, a single multi-view image among the at least one multi-view image in response to request for the single multi-view image.

* * * * *